(12) United States Patent
Shinozaki et al.

(10) Patent No.: US 12,276,083 B2
(45) Date of Patent: Apr. 15, 2025

(54) SPEED REDUCER AND CONSTRUCTION MACHINE

(71) Applicant: Nabtesco Corporation, Tokyo (JP)

(72) Inventors: Takuya Shinozaki, Tokyo (JP); Etsuro Komori, Tokyo (JP)

(73) Assignee: Nabtesco Corporation, Tokyo (JP)

( * ) Notice: Subject to any disclaimer, the term of this patent is extended or adjusted under 35 U.S.C. 154(b) by 566 days.

(21) Appl. No.: 17/673,528

(22) Filed: Feb. 16, 2022

(65) Prior Publication Data

US 2022/0316178 A1 Oct. 6, 2022

(30) Foreign Application Priority Data

Mar. 31, 2021 (JP) .................................. 2021-060386
Nov. 17, 2021 (JP) .................................. 2021-187257

(51) Int. Cl.
*E02F 9/20* (2006.01)
*E02F 9/02* (2006.01)
(Continued)

(52) U.S. Cl.
CPC ................ *E02F 9/202* (2013.01); *E02F 9/02* (2013.01); *F16H 1/28* (2013.01); *F16H 57/0412* (2013.01); *F16H 57/0424* (2013.01); *F16H 57/0476* (2013.01); *F16H 57/0486* (2013.01); *B60Y 2200/412* (2013.01)

(58) Field of Classification Search
CPC .... E02F 9/02; E02F 9/202; F16H 1/28; F16H 57/0412; F16H 57/0476; F16H 57/048; F16H 57/0482; F16H 57/0486; F16H 57/0424; B60Y 2200/412
See application file for complete search history.

(56) References Cited

U.S. PATENT DOCUMENTS

2014/0364263 A1* 12/2014 Tokunaga ............. F16C 35/063
310/90
2016/0229015 A1 8/2016 Takahashi

FOREIGN PATENT DOCUMENTS

CN 109630622 A * 4/2019 ............... F16H 1/32
JP 2016-191450 A 11/2016

OTHER PUBLICATIONS

Extended European Search Report dated Aug. 30, 2022, issued in corresponding European Patent Application No. 22157275.3 (14 pgs.).

* cited by examiner

*Primary Examiner* — Loren C Edwards
(74) *Attorney, Agent, or Firm* — Pillsbury Winthrop Shaw Pittman, LLP

(57) ABSTRACT

A speed reducer according to one aspect of the present disclosure includes: speed reducing units for decelerating a rotational driving force of an electric motor and transmitting the decelerated rotational driving force to a rotational driving unit; and a ring gear meshing with a gear decelerated by a speed reducing unit on the electric motor side in a direction of a rotational axis of the electric motor. The ring gear is provided with a water-cooling channel that communicates cooling water. The water-cooling channel includes a first groove having a small depth and a second groove having a larger depth and extends in a C-shape as the ring gear is viewed from the direction of the rotational axis. The ring gear is provided with a motor flange mounted to the electric motor. The motor flange is provided with an inlet port and an outlet port connected to the water-cooling channel.

13 Claims, 4 Drawing Sheets

(51) Int. Cl.
*F16H 1/28* (2006.01)
*F16H 57/04* (2010.01)

SPEED REDUCER AND CONSTRUCTION MACHINE

CROSS-REFERENCE TO RELATED APPLICATIONS

This application is based on and claims the benefit of priority from Japanese Patent Applications Serial Nos. 2021-060386 (filed on Mar. 31, 2021) and 2021-187257 (filed on Nov. 17, 2021), the contents of which are incorporated herein.

TECHNICAL FIELD

The present disclosure relates to a speed reducer and a construction machine.

BACKGROUND

In a construction machine such as an excavator, actuators are hydraulically controlled via a pump using an engine as a drive source. In recent years, it has been proposed to replace the engine as a drive source with a battery used as a drive source for driving the pump. Further, as disclosed in Japanese Patent Application Publication No. 2016-191450 ("the '450 Publication"), it has been proposed to use electric motors for electrically driving the actuators on a battery.

Since an electric motor tends to have a larger size than a hydraulic motor, an electric motor employed is required to rotate at a high speed for downsizing. However, when an electric motor rotates at a high speed, heating tends to occur particularly at a first-stage speed reducing unit that is directly connected to the motor shaft. Therefore, the heated portion needs to be cooled. The '450 Publication, for example, discloses that a fan and a hood are provided on the input shaft side for forcible air cooling to cool the heated portion. However, the cooling system with a fan is open for intake and exhaust of the air, and thus dirt enters the cooling system in the service environment of the construction machines. Therefore, with the cooling system with a fan, it is difficult to install a downsized electric motor on the construction machines. This drawback needs to be overcome.

SUMMARY

The present disclosure provides a speed reducer and a construction machine, the speed reducer using a fluid to inhibit heating of the speed reducing unit, thereby permitting both high speed rotation and downsizing and also facilitating installation on the construction machines.

(1) A speed reducer according to one aspect of the present disclosure comprises: at least one speed reducing unit for decelerating a rotational driving force of an electric motor and transmitting the decelerated rotational driving force to a rotational driving unit; and a channel provided in a gear of the at least one speed reducing unit and configured to communicate a fluid.

In this configuration, the channel cools the gear, and the speed reducing unit connected directly to a motor shaft can be inhibited from heating. Thus, the speed reducing unit can handle high speed rotation of the electric motor, and the electric motor can be downsized. Further, the cooling method using the channel prevents entrance of dirt unlike the conventional air-cooling system with a fan which is open for intake and exhaust of the air. Thus, it is possible to facilitate installation on the construction machines that are apt to entrance of dirt.

(2) The at least one speed reducing unit may comprise a plurality of speed reducing units. Among the plurality of speed reducing units, a speed reducing unit positioned at an end on an input side and configured to receive the rotational driving force of the electric motor may include the gear provided with the channel.

(3) The at least one speed reducing unit may include: a sun gear configured to receive the rotational driving force of the electric motor; a ring gear encircling the sun gear and having internal teeth; and one or more planetary gears provided between the sun gear and the ring gear and meshing with the sun gear and the ring gear. The gear may be the ring gear.

(4) The channel may have a C-shape as the gear is viewed from a direction of a rotational axis of the electric motor. The channel may include: a first groove having a small depth; and at least one second groove formed in a portion of the first groove. The at least one second groove may have a larger depth than the first groove.

(5) The at least one second groove may comprise a plurality of second grooves arranged at predetermined intervals in a circumferential direction of the first groove.

(6) One or more planetary gears meshing with the gear may be provided and a number of the at least one second groove may be different from a number of the one or more planetary gears.

(7) The gear may be provided with a flange, and the flange may be provided with an inlet port and an outlet port connected to the channel.

(8) The flange may be mounted to the electric motor.

(9) A speed reducer according to another aspect of the present disclosure comprises: a plurality of speed reducing units for decelerating a rotational driving force of an electric motor and transmitting the decelerated rotational driving force to a rotational driving unit; and a channel provided in a gear of the at least one speed reducing unit and configured to communicate a fluid. Among the plurality of speed reducing units, a speed reducing unit positioned at an end on an input side and configured to receive the rotational driving force of the electric motor includes the gear provided with the channel. The speed reducing unit positioned at the end on the input side includes: a sun gear configured to receive the rotational driving force of the electric motor; a ring gear encircling the sun gear and having internal teeth; and one or more planetary gears provided between the sun gear and the ring gear and meshing with the sun gear and the ring gear. The gear is the ring gear. The channel has a C-shape as the gear is viewed from a direction of a rotational axis of the electric motor, and the channel includes a first groove having a small depth and a plurality of second grooves formed in a portion of the first groove. The plurality of second grooves have a larger depth than the first groove and are arranged at predetermined intervals. Wherein a number of the plurality of second grooves is different from a number of the one or more planetary gears, The gear is provided with a flange mounted to the electric motor. The flange is provided with an inlet port and an outlet port connected to the channel.

In this configuration, the channel cools the gear, and the speed reducing unit connected directly to a motor shaft can be inhibited from heating. Thus, the speed reducing unit can handle high speed rotation of the electric motor, and the electric motor can be downsized. Further, the cooling method using the channel prevents entrance of dirt unlike the conventional air-cooling system with a fan which is open for intake and exhaust of the air. Thus, it is possible to facilitate installation on the construction machines that are apt to entrance of dirt. Further, among the plurality of speed reducing units, the speed reducing unit positioned at the end on the input side includes the gear provided with the channel. This makes it possible to efficiently cool the speed reducing unit on the input side which rotates at the highest speed and tends to heat. Further, the gear can be fixed unrotatably, making it possible to simplify the piping structure extending from the fluid supply installed on a construction machine or the like to the channel. Further, in the region of the speed reducing unit where meshing strength of the gears is needed, the grooves are not provided in the entire circumference, and the second groove having a larger depth can be provided in a part of the circumference. That is, in the regions where the meshing strength is less affected, the first groove having a small depth can be provided to allow circulation of the fluid, and in addition, portions of the gears that need to be cooled can be cooled by the fluid entering the second groove. Further, the fluid flows through the channel in one direction, and the inlet port and the outlet port are connected to the external fluid supply by piping. Thus, the fluid can be circulated efficiently. Further, the flange is mounted to the electric motor, and thus it is also possible to cool the electric motor connected to the motor flange. Therefore, heating of the electric motor itself can also be inhibited.

(10) A construction machine according to one aspect of the present disclosure comprises: a vehicle body; a drive wheel for traveling of the vehicle body; and an electric motor and a speed reducer for driving the drive wheel. The speed reducer includes: a speed reducing unit for decelerating a rotational driving force of an electric motor and transmitting the decelerated rotational driving force to a rotational driving unit; and a channel provided in a gear of the speed reducing unit and configured to communicate a fluid. The gear is fixed to the vehicle body or the drive wheel, and the rotational driving force of the electric motor is transmitted to the drive wheel via the speed reducer. The channel is connected to a fluid supply provided on at least one of the vehicle body or the drive wheel.

With this configuration, the speed reducer can be installed such that the channel is connected to the fluid supply provided on the construction machine.

With the speed reducer and the construction machine of the present disclosure, it is possible to inhibit heating of the speed reducing unit, thereby permitting both high speed rotation and downsizing and also facilitating installation on the construction machines.

DESCRIPTION OF THE EMBODIMENTS

The following describes embodiments of the present disclosure with reference to the drawings. In the following embodiments and modifications, like elements will be denoted by the same reference signs and redundant descriptions will be partly omitted.

Figure 1:
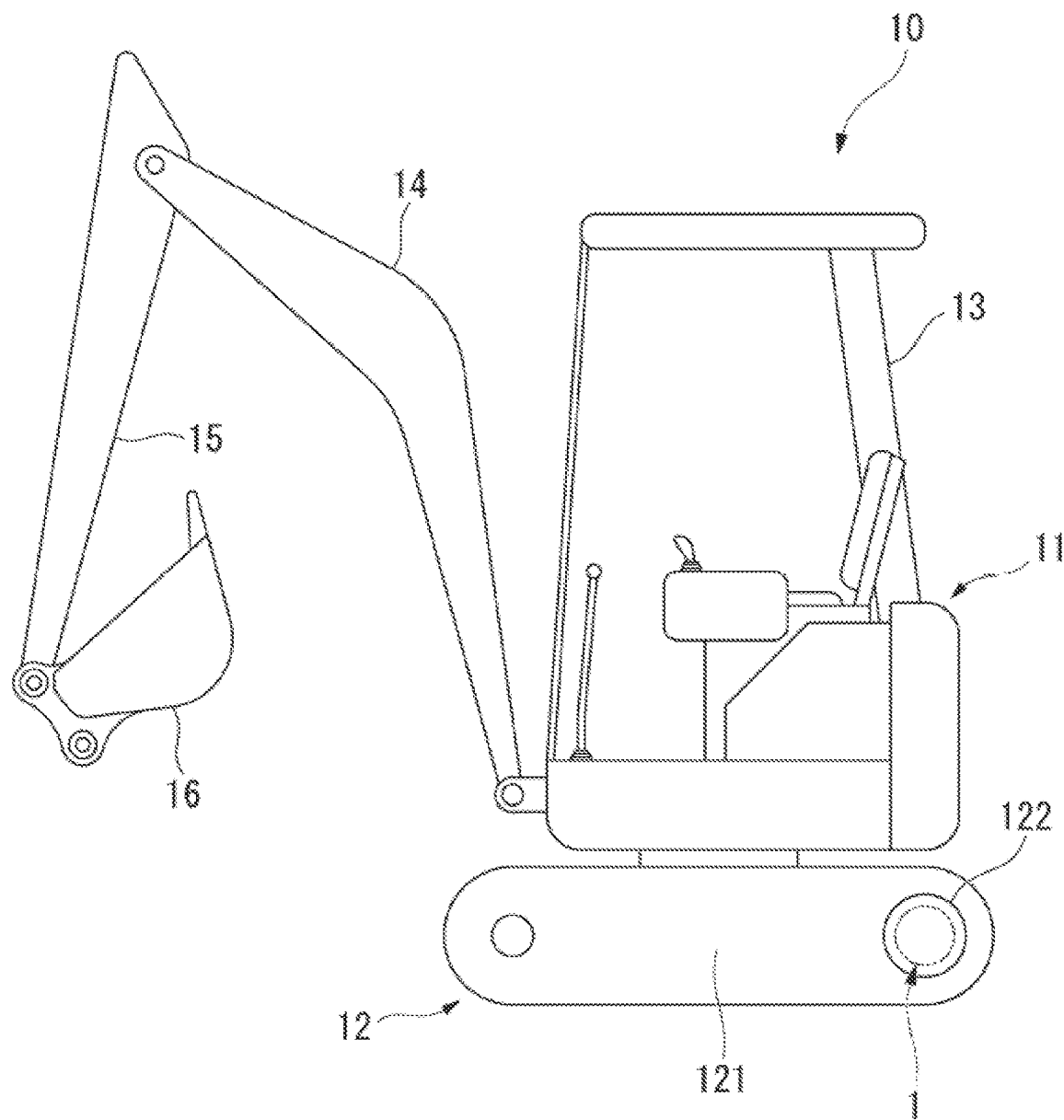
FIG. 1 is a side view of an excavator including a speed reducer according to an embodiment.

FIG. 1 is a side view of an excavator 10 (construction machine) including an electric motor 2 with a speed reducer 1 in a driving unit. The excavator 10 of the embodiment travels by a crawler, which is a form of an undercarriage 12. The excavator 10 includes the undercarriage 12 and a turning upper structure 11 disposed on the undercarriage 12 so as to be turnable.

The turning upper structure 11 includes a cab 13, a boom 14, an arm 15, and a bucket 16. The cab 13 houses an operator, the boom 14 is rotatably supported at its proximal end portion on the front portion of the cab 13, the arm 15 is rotatably connected at its proximal end portion to the distal end portion of the boom 14, and the bucket 16 is rotatably connected to the distal end portion of the arm 15. Joints of the cab 13, the boom 14, the arm 15, and the bucket 16 have drive devices installed therein (not shown). The drive devices in these joints are driven by operation of the operator in the cab 13. The undercarriage 12 includes a crawler body 121 (vehicle body) and a drive wheel 122 rotatably supported on the crawler body 121. The undercarriage 12 is provided with an electric motor 2 including a speed reducer 1 for driving the drive wheel 122.

Figure 2:
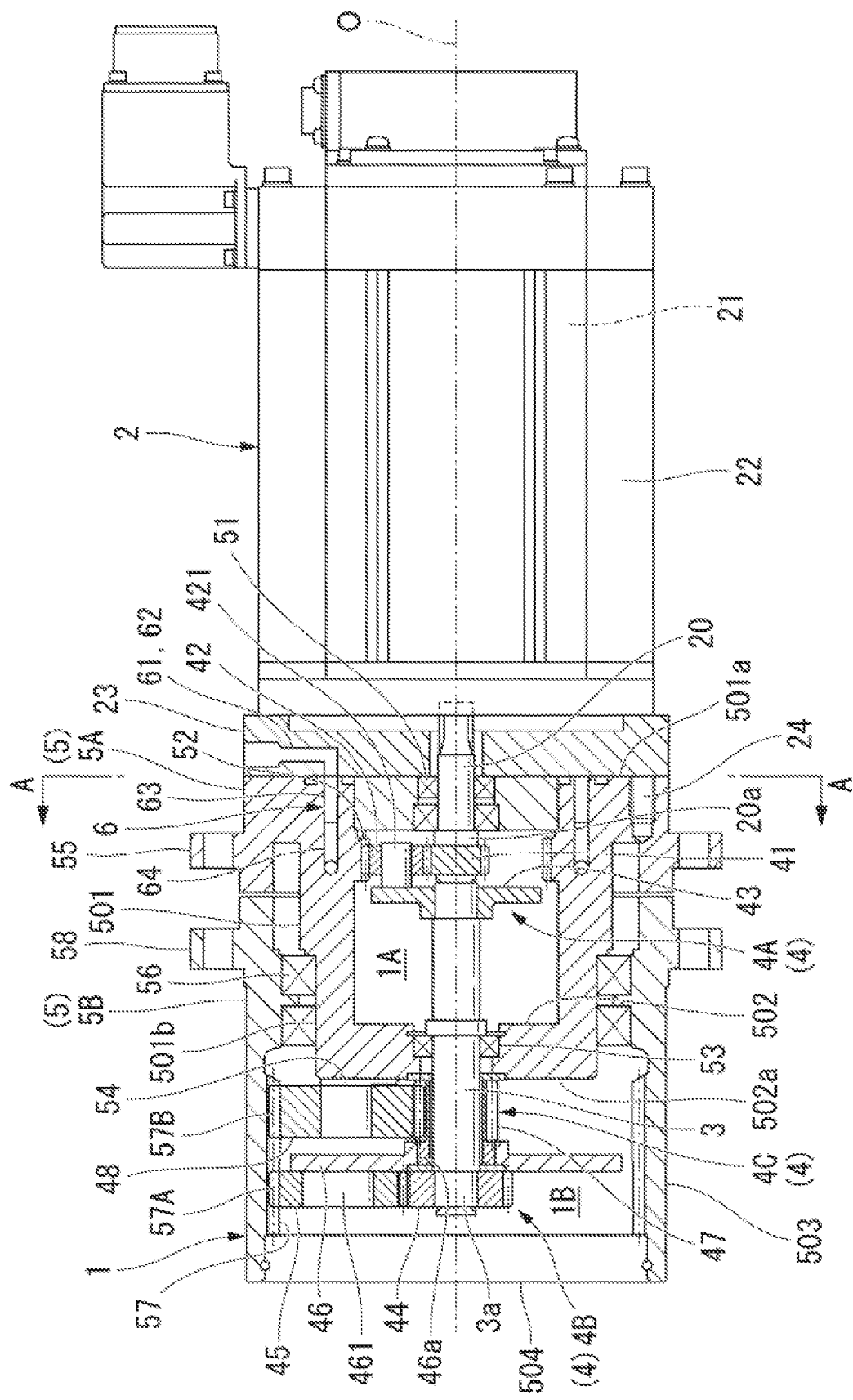
FIG. 2 is a sectional view of the speed reducer with an electric motor according to an embodiment.

FIG. 2 is a sectional view of the speed reducer 1 with the electric motor 2 (cut along a plane including the rotational axis O). The shapes and dimensions of the speed reducer 1 shown in FIG. 2 are examples and do not correspond to actual ones.

The speed reducer 1 is connected to the electric motor 2 that can rotate both positively and negatively. The rotational driving force of the electric motor 2 is decelerated at the speed reducer 1 and output as a rotational motion that is transmitted to an axle provided on the drive wheel 122.

The speed reducer 1 includes three speed reducing units 4 each formed of a planetary gear mechanism provided between a motor shaft 20 of the electric motor 2 and the axle. In the following description, the central axis of the motor shaft 20 is referred to as the rotational axis O. Further, the motor shaft 20 side in the direction along the rotational axis O is referred to as "the input side," while the side opposite thereto is referred to as "the output side."

The electric motor 2 includes a motor shaft 20, a motor body 21, a motor case 22 retaining the motor body 21, and a motor flange 23 fixed to one end of the motor case 22. The motor shaft 20 extends in the motor axis direction through the central portion of the motor body 21. The distal end portion 20a of the motor shaft 20 positioned at one end side (the left side in the drawing) projects into the speed reducer 1. The electric motor 2 is mounted to the speed reducer 1 via the motor flange 23. The motor flange 23 is shaped like a plate. The motor flange 23 is mounted to the motor case 22 and projects radially outward relative to the motor case 22. The electric motor 2 may be selected from various motors that drive on electricity, such as what is called brushed motors and brushless motors.

The speed reducer 1 includes a plurality of speed reducing units 4. Specifically, the speed reducing units 4 of the speed reducer 1 include a first speed reducing unit 4A at the first stage, a second speed reducing unit 4B at the second stage, and a third speed reducing unit 4C at the third stage. The first speed reducing unit 4A, the second speed reducing unit 4B, and the third speed reducing unit 4C are arranged in the order in which the rotational driving force from the motor shaft 20 is transmitted. Specifically, these speed reducing units 4 are arranged in the order of the first speed reducing unit 4A, the third speed reducing unit 4C, and the second speed reducing unit 40 from the input side to the output side in the direction along the rotational axis O. That is, the third speed reducing unit 4C is interposed between the first speed reducing unit 4A and the second speed reducing unit 4B. The first speed reducing unit 4A is rotatably supported by a first ring gear 5A (gear). The second speed reducing unit 4B and the third speed reducing unit 4C share a second ring gear 5B and are rotatably supported by the second ring gear 5B. The first ring gear 5A and the second ring gear 5B constitute a ring gear 5.

In the embodiment, as shown in FIG. 1, the first ring gear 5A is connected to the crawler body 121, and the second ring gear 5B is connected to the drive wheel 122 of the undercarriage 12. However, the first ring gear 5A and the second ring gear 5B are not necessarily connected in this way to the excavator 10. For example, it is also possible that the first ring gear 5A is connected to the drive wheel 122, and the second ring gear 5B is connected to the crawler body 121. In this configuration, the rotational driving force of the electric motor 2 is also transmitted to the undercarriage 12 via the speed reducer 1.

The speed reducer 1 is fixed to an output-side end surface 23b of the motor flange 23 with a fixing bolt 24. Specifically, the speed reducer 1 is mounted to the motor flange 23 such that an end portion of the first ring gear 5A on the input side (an input-side end surface 501a) is in tight contact with the output-side end surface 23b. Thus, a first speed reducer chamber 1A inside the speed reducer 1 is closed in an air-tight manner. The first speed reducer chamber 1A is filled with a lubricant.

The first ring gear 5A is shaped like a bottomed tube. The first ring gear 5A includes an inner tubular wall 501 and a bottom wall 502. The inner tubular wall 501 is disposed coaxially with the rotational axis O, and the bottom wall 502 is opposed to the motor flange 23 and closes an output-side end portion of the inner tubular wall 501. The input-side end surface 501a of the inner tubular wall 501 is fixed to the motor flange 23 with the fixing bolt 24. That is, the first ring gear 5A is integrated with the electric motor 2 so as not to be rotatable relative to the electric motor 2. In an opening of the inner tubular wall 501 on the electric motor 2 side, a first bearing 51 is provided to support the motor shaft 20 rotatably. A first internal gear 52 is provided on an inner peripheral surface of the inner tubular wall 501 on the input side. A plurality of first planetary gears 42 are disposed inside the inner tubular wall 501 so as to mesh with the first internal gear 52.

The first ring gear 5A is not mounted to the motor shaft 20 that rotates, but is fixed to the motor flange 23 that is fixed to the motor case 22. Thus, the first ring gear 5A operates as a fixed gear.

In the embodiment, the inner tubular wall 501 is provided with a first fixing portion 55 to be fixed to the crawler body 121 of the excavator 10.

On the bottom wall 502 of the first ring gear 5A, there are provided a second bearing 53 and rotational support columns 54. The second bearing 53 rotatably supports a speed reducing input shaft 3 that is formed of a shaft member, and the rotational support columns 54 rotatably support third gears 48 of the third speed reducing unit 4C. The rotational support columns 54 are provided on an output-side end surface 502a of the bottom wall 502 so as to project integrally in the direction of the rotational axis O.

The second ring gear 5B includes an outer tubular wall 503 that is fitted on an outer peripheral surface 501b of the inner tubular wall 501 of the first ring gear 5A via a third bearing 56 so as to be rotatable in the circumferential direction. A lid 504 is mounted to an opening positioned on the output side (the left side in the drawing) of the outer tubular wall 503. The lid 504 closes tightly a second speed reducer chamber 1B filled with the lubricant.

A second internal gear 57 is provided on an inner peripheral surface of the outer tubular wall 503. A plurality of second planetary gears 45 and the third gears 48 (described later) are disposed inside the outer tubular wall 503. Both the plurality of second planetary gears 45 and the third gears 48 are disposed so as to mesh with the second internal gear 57. The second ring gear 5B is associated with both the second planetary gears 45 and the third gears 48. The second ring gear 5B is a stepped gear having a large-diameter gear 57A and a small-diameter gear 57B. The large-diameter gear 57A, which is a portion of the second internal gear 57 meshed with the second planetary gears 45, has a larger inner diameter than the small-diameter gear 57B, which is a portion of the second internal gear 57 meshed with the third gears 48. In the embodiment, the outer tubular wall 503 is provided with a second fixing portion 58 to be fixed to the drive wheel 122 of the excavator 10. The large-diameter gear 57A meshed with the second speed reducing unit 4B and the small-diameter gear 578 meshed with the third speed reducing unit 4C are not capable of relative rotation.

The speed reducing input shaft 3, which extends through the bottom wall 502 of the first ring gear 5A, and the rotational support columns 54, which are fixed to the bottom wall 502, are inserted in the second speed reducer chamber 1B.

As described above, the speed reducer 1 contains the first speed reducer chamber 1A, which forms space inside the first ring gear 5a, and the second speed reducer chamber 1B, which forms space inside the second ring gear 5B. The firsts speed reducer chamber 1A and the second speed reducer chamber 1B are partitioned by the bottom wall 502 of the first ring gear 5A. The output-side portion of the motor shaft 20 is inserted and positioned in the first speed reducer chamber 1A. The distal end portion 20a of the motor shaft 20 is connected with the speed reducing input shaft 3 positioned coaxially with the motor shaft 20.

The first speed reducing unit 4A includes a first sun gear 41, a plurality of first planetary gears 42, and a first carrier 43. The first sun gear 41 is connected coaxially to the motor shaft 20. The plurality of first planetary gears 42 are arranged at regular intervals in the circumferential direction around the first sun gear 41. The first planetary gears 42 are disposed to mesh with the first internal gear 52 of the first ring gear 5A and supported rotatably on the shaft portions 421 provided on the first carrier 43. That is, the first planetary gears 42 are disposed to mesh with both the first sun gear 41 and the first ring gear 5A.

The shaft portions 421 of the first planetary gears 42 are coupled to the first carrier 43 by press-fitting. The first carrier 43 is shaped like a flat plate ring. The first carrier 43 is positioned on the output side of the first planetary gears 42 in the direction of the rotational axis O and fixed coaxially with the motor shaft 20 so as to be prohibited from rotating relative to the speed reducing input shaft 3. The connection portion between the motor shaft 20 and the speed reducing input shaft 3 is positioned between the first sun gear 41 and the first carrier 43.

In the first speed reducing unit 4A, the rotational driving force of the electric motor 2 is decelerated through the motor shaft 20, the first sun gear 41, the first planetary gears 42, and the first carrier 43 and transmitted to the speed reducing input shaft 3.

The second speed reducing unit 4B includes a second sun gear 44, a plurality of second planetary gears 45, and a second carrier 46. The second sun gear 44 is connected coaxially with a distal end portion 3a of the speed reducing input shaft 3 positioned on the output side (the left side in the drawing). The plurality of second planetary gears 45 are arranged at regular intervals in the circumferential direction around the second sun gear 44. The second planetary gears 45 are disposed to mesh with the second internal gear 57 (the large-diameter gear 57A) of the second ring gear 5B and supported rotatably on the shaft portions 461 provided on the second carrier 46. That is, the second planetary gears 45 are disposed to mesh with both the second sun gear 44 and the second ring gear 5B.

The shaft portions 461 of the second planetary gears 45 are coupled to the second carrier 46 by press-fitting. The second carrier 46 is shaped like a flat plate ring. The second carrier 46 is positioned on the input side of the second planetary gears 45 in the direction of the rotational axis O and fixed coaxially with the motor shaft 20 so as to be rotatable relative to the speed reducing input shaft 3. The second carrier 46 is positioned between the second sun gear 44 and a third sun gear 47 in the direction of the motor axis.

In the second speed reducing unit 4B, the rotational driving force decelerated at the first speed reducing unit 4A is decelerated through the speed reducing input shaft 3, the second sun gear 44, the second planetary gears 45, and the second carrier 46 and transmitted to the third sun gear 47 of the third speed reducing unit 4C.

The third speed reducing unit 4C includes a third sun gear 47 and a plurality of third gears 48. The third sun gear 47 has a hollow portion penetrated by the speed reducing input shaft 3. The speed reducing input shaft 3 penetrates both the first carrier 43 and the third sun gear 47. The speed reducing input shaft 3 penetrating the third sun gear 47 has the distal end portion 3a to which the second sun gear 44 is fixed coaxially. The output side of the third sun gear 47 is unrotatably engaged and thus integrated with an inner periphery 46a of the second carrier 46. Accordingly, the third sun gear 47 rotates with the second carrier 46.

The plurality of third gears 48 are arranged at regular intervals in the circumferential direction around the third sun gear 47. The third gears 48 are disposed to mesh with the second internal gear 57 (the small-diameter gear 57B) of the second ring gear 5B and supported rotatably on the rotational support columns 54 projecting toward the output side from the bottom wall 502 of the first ring gear 5A. That is, the third gears 48 are disposed to mesh with both the third sun gear 47 and the second ring gear 58.

In the third speed reducing unit 4C, the rotational driving force decelerated at the second speed reducing unit 4B is decelerated through the third sun gear 47 and the third gears 48 and transmitted to the second ring gear 5B.

Figure 3:
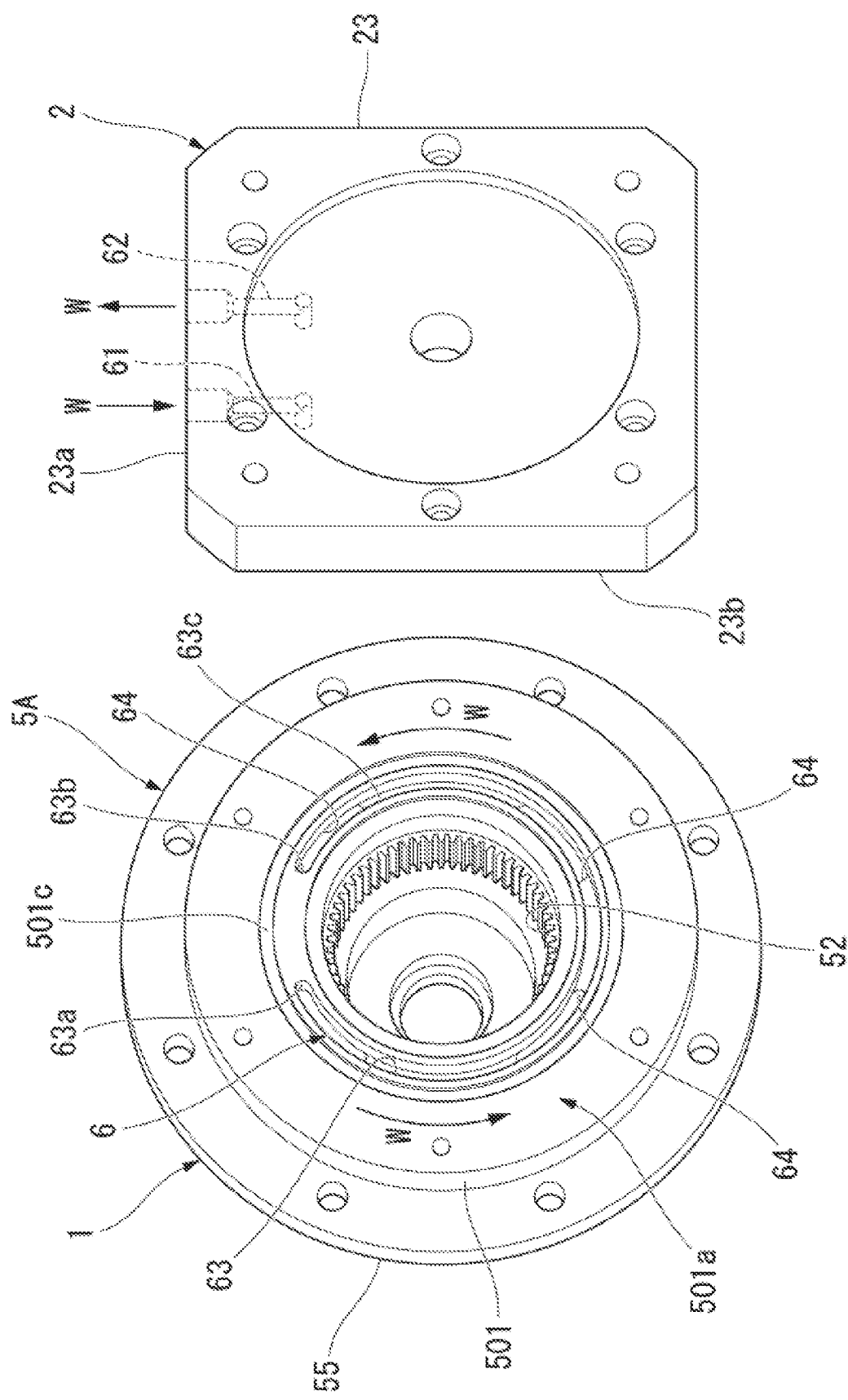
FIG. 3 is a perspective view showing a first ring gear and a motor flange separated from each other.

As shown in FIGS. 2 and 3, the first ring gear 5A is provided with a water-cooling channel 6 (channel) for cooling the first speed reducing unit 4A by water cooling. The motor flange 23 is provided with an inlet port 61 and an outlet port 62 connected to the water-cooling channel 6. The water-cooling channel 6 is disposed in the first ring gear 5A and connected to the inlet port 61 and the outlet port 62.

Each of the inlet port 61 and the outlet port 62 extends from an outer peripheral surface 23a of the motor flange 23 and bent in an L-shape toward the output-side end surface 23b. The inlet port 61 receives cooling water W (fluid) from the outside into the water-cooling channel 6. The outlet port 62 discharges the cooling water W flowing through the water-cooling channel 6 to the outside. The inlet port 61 and the outlet port 62 are connected by piping to a water supply (not shown) installed on a portion of the excavator 10 described above.

Figure 4:
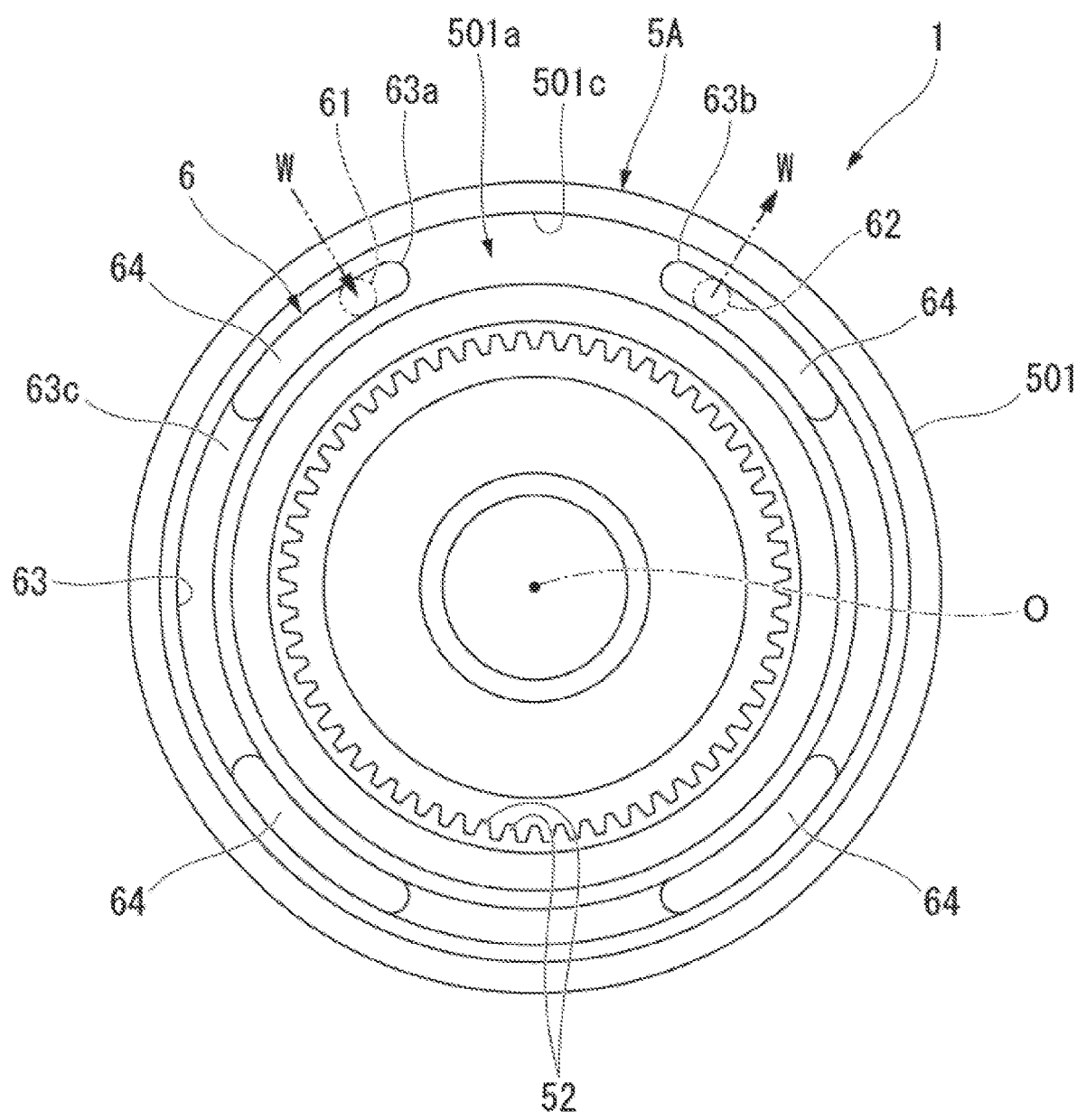
FIG. 4, viewed along the arrows A-A in FIG. 2, is a plan view of the first ring gear viewed from the axial direction.

As shown in FIG. 4, the water-cooling channel 6 is disposed in the input-side end surface 501a of the inner tubular wall 501 of the first ring gear 5A facing the motor flange 23. On an outer peripheral edge 501c positioned on the outer peripheral side of the water-cooling channel 6 as viewed from the direction of the rotational axis O, a waterproof member (not shown) such as an O-ring is provided so as to be in contact with the motor flange 23 in a liquid tight manner. The water-cooling channel 6 extends in a C-shape as viewed from the direction of the rotational axis O. The water-cooling channel 6 includes a first groove 63 having a small depth and a plurality (four in this embodiment) of second grooves 64 formed in a portion of the first groove 63 and having a larger depth than the first groove 63. The C-shape of the water-cooling channel 6 mentioned above is a substantially circular shape with a portion thereof in the circumferential direction cut off. The length of the portion cut off is not particularly limited. The substantially circular shape of the water-cooling channel 6 may be an ellipse or a polygon, for example. In this embodiment, the portion of the C-shape of the water-cooling channel 6 having no groove (the portion in which an inlet 63a and an outlet 63b (described later) are positioned) faces upward but this is not limitative. This portion may face downward or laterally, for example.

The second grooves 64 are deeper than a bottom 63c of the first groove 63. As shown in FIG. 2, in the direction of the rotational axis O, the second grooves 64 are positioned to run close to the first internal gear 52 meshed with the first planetary gears 42 of the first speed reducing unit 4A. The inlet 63a positioned at one end of the water-cooling channel 6 in the extension direction thereof is connected with the inlet port 61. The outlet 63b positioned at the other end of the water-cooling channel 6 in the extension direction thereof is connected with the outlet port 62. The cooling water W received through the inlet 63a of the water-cooling channel 6 flows toward the outlet 63b (in the direction of the arrows shown in FIGS. 3 and 4) and are discharged through the outlet 63b. At this time, the cooling water W flowing into the first groove 63 enters the four second grooves 64.

As shown in FIG. 2, the speed reducer 1 thus configured receives the rotational driving force input from the motor shaft 20 rotated by the electric motor 2. The rotational driving force causes the first planetary gears 42 to rotate while revolving around the rotational axis O, in accordance with the differences in the number of teeth between the first sun gear 41 and the first planetary gears 42 and between the first planetary gears 42 and the first internal gear 52 of the first ring gear 5A, in the first speed reducing unit 4A. Further, the decelerated rotational driving force is transmitted from the first speed reducing unit 4A to the speed reducing input shaft 3 through the first carrier 43 supporting the first planetary gears 42.

When the rotational driving force is input from the first speed reducing unit 4A to the speed reducing input shaft 3 connected to the motor shaft 20, the second planetary gears 45 rotate while revolving around the rotational axis O, in accordance with the differences in the number of teeth between the second sun gear 44 and the second planetary gears 45 and between the second planetary gears 45 and the second ring gear 5B (the large-diameter gear 57A), in the second speed reducing unit 4B fixed to the distal end portion 3a of the speed reducing input shaft 3. Further, the decelerated rotational driving force is transmitted from the second speed reducing unit 4B to the third sun gear 47 of the third speed reducing unit 4C through the second carrier 46 supporting the second planetary gears 45.

When the rotational driving force is input from the second carrier 46 of the second speed reducing unit 4B to the third sun gear 47 of the third speed reducing unit 4C, the third gears 48 rotate and the second ring gear 5B meshing with the third gears 48 rotate around the rotational axis O, in accordance with the differences in the number of teeth between the third sun gear 47 and the third gears 48 and between the third gears 48 and the second ring gear 5B (the small-diameter gear 57B), in the third speed reducing unit 4C. That is, the decelerated rotational driving force is transmitted from the third speed reducing unit 4C to the second ring gear 5B through the third gears 48. Further, the decelerated rotational driving force can be output to the drive wheel 122 of the excavator 10 fixed to the second fixing portion 58 of the second ring gear 5B.

As described above, in the speed reducer 1 of the embodiment, the speed reducing units 4 decelerate the rotational driving force of the electric motor 2 and transmit the decelerated rotational driving force to the rotational driving unit, and the water-cooling channel 6 is provided in the first ring gear 5A to communicate a fluid (the cooling water W). Therefore, the first speed reducing unit 4A, which meshes with the first ring gear 5A cooled by the water-cooling channel 6, is also cooled, making it possible to inhibit heating of the first speed reducing unit 4A connected directly to the motor shaft 20. Thus, the first speed reducing unit 4A can handle high speed rotation of the electric motor 2, and the electric motor 2 can be downsized. Further, the water-cooling is accomplished with the water-cooling channel 6. This prevents entrance of dirt unlike the conventional air-cooling system with a fan which is open for intake and exhaust of the air, thus facilitating installation on the construction machines that are apt to entrance of dirt.

Further, the speed reducer 1 of the embodiment includes the plurality of speed reducing units 4. Among the plurality of speed reducing units 4, the first speed reducing unit 4A is positioned at the end on the input side, and the gear of the first speed reducing unit 4A (the first ring gear 5A) is provided with the water-cooling channel 6. This makes it possible to efficiently cool the first speed reducing unit 4A on the input side which rotates at the highest speed and tends to heat.

Further, in the speed reducer 1 of the embodiment, the speed reducing units 4 include the sun gear that receives the rotational driving force input from the electric motor 2, the ring gear 5 encircling the sun gear and having internal teeth, and the planetary gears provided between the sun gear and the ring gear 5 and meshing with the sun gear and the ring gear 5. The gear is the first ring gear 5A. Therefore, the first ring gear 5A can be fixed unrotatably, making it possible to simplify the piping structure extending from the water supply installed on a construction machine such as the excavator 10 of the embodiment to the water-cooling channel 6.

Further, in the speed reducer 1 of the embodiment, the water-cooling channel 6 has a C-shape as the first ring gear 5A is viewed from the direction of the rotational axis O of the electric motor 2. The water-cooling channel 6 includes the first groove 63 having a small depth and at least one second groove 64 formed in a portion of the first groove 63 and having a larger depth than the first groove 63. Therefore, in the region of the first speed reducing unit 4A (a portion of the first internal gear 52) where meshing strength of the gears (the first planetary gears 42) is needed, the grooves are not provided in the entire circumference, and the second groove 64 having a larger depth can be provided in a part of the circumference. That is, in the regions where the meshing strength mentioned above is less affected, the first groove 63 having a small depth can be provided to allow the cooling water W to flow therein. In addition, a portion of the first internal gear 52 where cooling is needed can be cooled using the cooling water W entering the second groove 64.

Further, in the speed reducer 1 of the embodiment, a plurality of second grooves 64 are arranged at predetermined intervals. Since the second grooves having a larger depth than the first groove reduce the rigidity of the first ring gear 5A (the fixed gear), it is supposed that the first ring gear 5A should have a larger outer diameter. However, in the embodiment, the second grooves are provided in a part of the circumference, making it possible to inhibit the first ring gear 5A from having a reduced rigidity or having a larger outer diameter.

Further, in the speed reducer 1 of the embodiment, the first planetary gears 42 are provided to mesh with the first ring gear 5A, and the number of the second grooves 64 is different from the number of the first planetary gears 42. That is, in the embodiment, four second grooves 64 are provided in the circumferential direction of the first groove 63, and one planetary gear 42 meshes with the first ring gear 5A. Since the number of the second grooves 64 and the number of the first planetary gears 42 are different, it can be prevented that the second grooves and the planetary gears are in phase for causing vibration as in the case where the number of the second grooves and the number of the planetary gears are the same.

Further, in the speed reducer 1 of the embodiment, the motor flange 23 is disposed on the first ring gear 5A. The motor flange 23 is provided with the inlet port 61 and the outlet port 62 connected to the water-cooling channel 6. Therefore, the cooling water W received through the inlet port 61 flows through the water-cooling channel 6 in one direction and is discharged through the outlet port 62. In this way, the cooling water W flows in one direction in the water-cooling channel 6. In addition, it is possible to connect the inlet port 61, the outlet port 62, and an external water supply (not shown) by piping. This configuration allows efficient circulation of the cooling water W.

Further, in the speed reducer 1 of the embodiment, the motor flange 23 is mounted to the electric motor 2, and thus it is also possible to cool the electric motor 2 connected to the motor flange 23. Therefore, heating of the electric motor 2 itself can also be inhibited.

Further, the embodiment is provided with the crawler body 121 (vehicle body), the drive wheel 122 for traveling of the crawler body 121, and the electric motor 2 and the speed reducer 1 for driving the drive wheel 122. In the speed reducer 1, the speed reducing units 4 decelerate the rotational driving force of the electric motor 2 and transmit the decelerated rotational driving force to the rotational driving unit, and the water-cooling channel 6 is provided in the first ring gear 5A to communicate the cooling water W. The first ring gear 5A is fixed to the crawler body 121 or the drive wheel 122. The rotational driving force of the electric motor 2 is transmitted to the drive wheel 122 via the speed reducer 1. The water-cooling channel 6 is connected to the water supply provided on at least one of the crawler body 121 or the drive wheel 122. Therefore, the speed reducer 1 can be installed such that the water-cooling channel 6 is connected to the water supply provided on the construction machine such as the excavator 10.

The present invention is not limited to the above-described embodiments but can be modified in a variety of designs without deviating from the spirit of the present invention. For example, in the above embodiments, the speed reducer 1 includes the three speed reducing units 4A, 4B, and 4C, but the number of the speed reducing units is not limited to three. For example, a speed reducer including two or one speed reducing unit may be provided with the water-cooling channel 6. Further, in the embodiment, the cooling water W is used as an example of the fluid, but the fluid is not limited to water. For example, use of fluids such as oil or other coolant is also possible.

Further, in the above embodiment, the water-cooling channel 6 (channel) is provided to the first ring gear 5A, but the water-cooling channel 6 is not necessarily provided to the first ring gear 5A that is a fixed gear. The channel may be provided to any gear. For example, with the planetary gear mechanism as in the above embodiment, the channel may be provided to the sun gear or the planetary gears instead of the ring gear, if the channel has structure for dynamic path alteration. This configuration also accomplishes the purport of the present invention.

Further, in the above embodiment, the second ring gear 5B is disposed on the output side of the first ring gear 5A in the direction of the rotational axis O, and the second ring gear 5B is rotatably supported on the first ring gear 5A, but this configuration with the second ring gear 5B is not limitative.

Further, in the above embodiment, the water-cooling channel 6 extends in a C-shape and includes the first groove 63 having a small depth and at least one second groove 64 formed in a portion of the first groove 63 and having a larger depth than the first groove 63. The water-cooling channel 6 is not limited to this two-stage groove shape but may have other shapes. It is also possible that the water-cooling channel 6 includes grooves in three or more stages, instead of two stages.

Further, in the above embodiment, the motor flange 23 mounted to the first ring gear 5A is provided with the inlet port 61 and the outlet port 62. It is also possible that the inlet port 61 and the outlet port 62 are provided in, for example, the first ring gear 5A instead of the motor flange 23.

Further, the speed reducer 1 of the embodiment is formed of the planetary gear mechanism as an example, but the speed reducer 1 is not necessarily formed of the planetary gear mechanism. For example, an eccentric oscillating speed reducer included in the planetary gear mechanism or a speed reducer with a center crank mechanism may be provided with the channel for cooling described above. An eccentric oscillating speed reducer includes a plurality of crankshafts arranged in the circumferential direction around the central axis of the speed reducer, and the eccentric oscillating speed reducer is configured such that an external gear oscillates and a carrier takes out rotation. A speed reducer with a center crank mechanism includes a crankshaft positioned coaxially with the central axis of the speed reducer, and is configured such that the crankshaft causes an external gear to oscillate and the rotation of the external gear is taken out from a pin of a carrier. The present invention can also be applied to a speed reducer including both an eccentric oscillating speed reducer and a center crank mechanism.

Further, in the embodiment, the transmission mechanism is based on speed reducing relationship (speed reducer), but the speed may also be maintained or increased.

Further, in the above embodiment, it was described that the speed reducer 1 is applied to the excavator 10, but this is not limitative. The speed reducer of the present invention can be applied to construction machines other than excavators.

The foregoing embodiments disclosed herein describe a plurality of physically separate constituent parts. They may be combined into a single part, and any one of them may be divided into a plurality of physically separate constituent parts. Irrespective of whether or not the constituent parts are integrated, they are acceptable as long as they are configured to attain the object of the invention.

What is claimed is:

1. A speed reducer comprising:
    at least one speed reducing unit for decelerating a rotational driving force of an electric motor and transmitting the decelerated rotational driving force to a rotational driving unit; and
    a channel provided in a gear of the at least one speed reducing unit and configured to communicate a fluid,
    wherein the channel has a C-shape as the gear provided with the channel is viewed from a direction of a rotational axis of the electric motor,
    wherein the gear provided with the channel is provided with a flange,
    wherein the flange is provided with an inlet port and an outlet port connected to the channel,
    wherein the channel extending in a circumferential direction,
    wherein an inlet positioned at one end of the channel in an extension direction thereof is connected with the inlet port,
    wherein an outlet positioned at the other end of the channel in the extension direction thereof is connected with the outlet port,
    wherein the fluid received through the inlet and the inlet port flows through the channel in a first direction along the extension direction from the inlet toward the outlet, and is discharged through the outlet and the outlet port, and
    wherein the fluid does not flow through the channel in a second direction along the extension direction, the second direction being opposite to the first direction.

2. The speed reducer of claim 1, wherein the at least one speed reducing unit comprises a plurality of speed reducing units, and
    wherein among the plurality of speed reducing units, a speed reducing unit positioned at an end on an input side and configured to receive the rotational driving force of the electric motor includes the gear provided with the channel.

3. The speed reducer of claim 2, wherein the speed reducing unit positioned at the end on the input side includes:
    a sun gear configured to receive the rotational driving force of the electric motor;
    a ring gear encircling the sun gear and having internal teeth; and
    one or more planetary gears provided between the sun gear and the ring gear and meshing with the sun gear and the ring gear,
    wherein the gear provided with the channel is the ring gear.

4. The speed reducer of claim 2,
    wherein the channel includes:
        a first groove having a small depth in the direction of the rotational axis; and
        at least one second groove formed in a portion of the first groove, and
    wherein the at least one second groove has a larger depth than the small depth of the first groove in the direction of the rotational axis.

5. The speed reducer of claim 1, wherein the at least one speed reducing unit includes:

a sun gear configured to receive the rotational driving force of the electric motor;
a ring gear encircling the sun gear and having internal teeth; and
one or more planetary gears provided between the sun gear and the ring gear and meshing with the sun gear and the ring gear,
wherein the gear provided with the channel is the ring gear.

6. The speed reducer of claim 5,
wherein the channel includes:
a first groove having a small depth in the direction of the rotational axis; and
at least one second groove formed in a portion of the first groove, and
wherein the at least one second groove has a larger depth than the small depth of the first groove in the direction of the rotational axis.

7. The speed reducer of claim 1,
wherein the channel includes:
a first groove having a small depth in the direction of the rotational axis; and
at least one second groove formed in a portion of the first groove, and
wherein the at least one second groove has a larger depth than the small depth of the first groove in the direction of the rotational axis.

8. The speed reducer of claim 7, wherein the at least one second groove comprises a plurality of second grooves arranged at predetermined intervals.

9. The speed reducer of claim 7, further comprising: one or more planetary gears meshing with the gear provided with the channel,
wherein a number of the at least one second groove is different from a number of the one or more planetary gears.

10. The speed reducer of claim 1, wherein the flange is mounted to the electric motor.

11. A speed reducer comprising:
a plurality of speed reducing units for decelerating a rotational driving force of an electric motor and transmitting the decelerated rotational driving force to a rotational driving unit; and
a channel provided in a gear of the plurality of speed reducing units and configured to communicate a fluid,
wherein among the plurality of speed reducing units, a speed reducing unit positioned at an end on an input side and configured to receive the rotational driving force of the electric motor includes the gear provided with the channel,
wherein the speed reducing unit positioned at the end on the input side includes:
a sun gear configured to receive the rotational driving force of the electric motor;
a ring gear encircling the sun gear and having internal teeth; and
one or more planetary gears provided between the sun gear and the ring gear and meshing with the sun gear and the ring gear,
wherein the gear provided with the channel is the ring gear,
wherein the channel has a C-shape as the gear provided with the channel is viewed from a direction of a rotational axis of the electric motor, and the channel includes a first groove having a small depth in the direction of the rotational axis and a plurality of second grooves formed in a portion of the first groove,
wherein the plurality of second grooves have a larger depth than the small depth of the first groove in the direction of the rotational axis and are arranged at predetermined intervals,
wherein a number of the plurality of second grooves is different from a number of the one or more planetary gears,
wherein the gear provided with the channel is provided with a flange mounted to the electric motor,
wherein the flange is provided with an inlet port and an outlet port connected to the channel,
wherein the channel extending in a circumferential direction,
wherein an inlet positioned at one end of the channel in an extension direction thereof is connected with the inlet port,
wherein an outlet positioned at the other end of the channel in the extension direction thereof is connected with the outlet port,
wherein the fluid received through the inlet and the inlet port flows through the channel in a first direction along the extension direction from the inlet toward the outlet, and is discharged through the outlet and the outlet port, and
wherein the fluid does not flow through the channel in a second direction along the extension direction, the second direction being opposite to the first direction.

12. A construction machine, comprising:
a vehicle body;
a drive wheel for traveling of the vehicle body; and
an electric motor and a speed reducer for driving the drive wheel,
wherein the speed reducer includes:
a speed reducing unit for decelerating a rotational driving force of the electric motor and transmitting the decelerated rotational driving force to a rotational driving unit; and
a channel provided in a gear of the speed reducing unit and configured to communicate a fluid,
wherein the gear provided with the channel is fixed to the vehicle body or the drive wheel, and the rotational driving force of the electric motor is transmitted to the drive wheel via the speed reducer, and
wherein the channel is connected to a fluid supply provided on at least one of the vehicle body or the drive wheel,
wherein the channel has a C-shape as the gear provided with the channel is viewed from a direction of a rotational axis of the electric motor,
wherein the gear provided with the channel is provided with a flange,
wherein the flange is provided with an inlet port and an outlet port connected to the channel,
wherein the channel extending in a circumferential direction,
wherein an inlet positioned at one end of the channel in an extension direction thereof is connected with the inlet port,
wherein an outlet positioned at the other end of the channel in the extension direction thereof is connected with the outlet port,
wherein the fluid received through the inlet and the inlet port flows through the channel in a first direction along the extension direction from the inlet toward the outlet, and is discharged through the outlet and the outlet port, and wherein the fluid does not flow through the channel in a second direction along the extension direction, the second direction being opposite to the first direction.

13. The speed reducer of claim 12, wherein the channel includes:
   a first groove having a small depth in the direction of the rotational axis; and
   at least one second groove formed in a portion of the first groove, and
wherein the at least one second groove has a larger depth than the small depth of the first groove in the direction of the rotational axis.

* * * * *